(12) United States Patent
Smith

(10) Patent No.: US 7,804,600 B1
(45) Date of Patent: Sep. 28, 2010

(54) RING-LASER GYROSCOPE SYSTEM USING DISPERSIVE ELEMENT(S)

(75) Inventor: David D. Smith, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 460 days.

(21) Appl. No.: 12/044,740

(22) Filed: Mar. 7, 2008

Related U.S. Application Data

(60) Provisional application No. 60/914,947, filed on Apr. 30, 2007.

(51) Int. Cl.
  *G01C 19/64* (2006.01)
  *H01S 3/083* (2006.01)
(52) U.S. Cl. ........................ 356/459; 372/94
(58) Field of Classification Search ................ 356/459, 356/460, 461; 372/94
  See application file for complete search history.

(56) References Cited

U.S. PATENT DOCUMENTS

| | | | |
|---|---|---|---|
| 4,396,290 A * | 8/1983 | Morris | 356/461 |
| 4,397,027 A * | 8/1983 | Zampiello et al. | 372/94 |
| 4,422,762 A * | 12/1983 | Hutchings et al. | 356/473 |
| 4,521,110 A * | 6/1985 | Roberts et al. | 356/459 |
| 4,686,683 A * | 8/1987 | Martin | 372/94 |
| 4,779,985 A * | 10/1988 | Wirt | 356/476 |
| 4,790,657 A * | 12/1988 | Kozma | 356/476 |
| 5,327,213 A * | 7/1994 | Blake et al. | 356/460 |
| 5,347,360 A * | 9/1994 | Holz | 356/467 |
| 5,377,283 A * | 12/1994 | Blake et al. | 385/11 |
| 5,469,257 A * | 11/1995 | Blake et al. | 356/464 |
| 5,488,622 A * | 1/1996 | Mitchell | 372/33 |
| 5,703,900 A | 12/1997 | Nozaki et al. | |
| 5,751,425 A * | 5/1998 | Frederick et al. | 356/467 |
| 5,786,895 A * | 7/1998 | Mitchell et al. | 356/467 |
| 5,815,519 A | 9/1998 | Aoshima et al. | |
| 6,078,395 A | 6/2000 | Jourdain et al. | |
| 6,317,449 B1 | 11/2001 | Zanger et al. | |
| 6,324,192 B1 | 11/2001 | Tayebati | |
| 6,370,178 B1 | 4/2002 | Papayoanou et al. | |
| 6,400,738 B1 | 6/2002 | Tucker et al. | |
| 6,424,419 B1 | 7/2002 | Tazartes et al. | |
| 6,441,907 B1 * | 8/2002 | Son et al. | 356/484 |
| 6,546,798 B1 | 4/2003 | Waters et al. | |
| 6,594,301 B2 | 7/2003 | Pang | |
| 6,650,682 B1 * | 11/2003 | Jones et al. | 372/94 |

(Continued)

OTHER PUBLICATIONS

Smith, David D. et al., Dispersion-Enhanced Laser Gyroscope, American Physical Society Journals Physical Review A; Nov. 20, 2008, pp. 1-37; vol. 78 Issue 5, American Physical Society, College Park, MD.

*Primary Examiner*—Patrick J Connolly
(74) *Attorney, Agent, or Firm*—Peter J. Van Bergen; James J. McGroary

(57) ABSTRACT

A ring-laser gyroscope system includes a ring-laser gyroscope (RLG) and at least one dispersive element optically coupled to the RLG's ring-shaped optical path. Each dispersive element has a resonant frequency that is approximately equal to the RLG's lasing frequency. A group index of refraction defined collectively by the dispersive element(s) has (i) a real portion that is greater than zero and less than one, and (ii) an imaginary portion that is less than zero.

24 Claims, 3 Drawing Sheets

U.S. PATENT DOCUMENTS

| | | |
|---|---|---|
| 6,724,785 B1 | 4/2004 | Tucker et al. |
| 6,747,775 B2 | 6/2004 | Little |
| 6,763,718 B1 | 7/2004 | Waters et al. |
| 6,904,206 B2 | 6/2005 | Bao et al. |
| 6,937,342 B2 * | 8/2005 | Osinski et al. ............... 356/461 |
| 6,993,257 B2 | 1/2006 | Althouse et al. |
| 7,068,700 B2 * | 6/2006 | Rapoport et al. ............... 372/94 |
| 7,085,441 B1 * | 8/2006 | Kozlov ........................ 385/11 |
| 7,163,872 B2 | 1/2007 | Choi et al. |
| 7,245,381 B2 * | 7/2007 | Marino et al. ................ 356/461 |
| 7,535,575 B2 * | 5/2009 | Mitchell et al. ............. 356/459 |
| 2006/0132788 A1 * | 6/2006 | Marino et al. ................ 356/461 |
| 2006/0245456 A1 * | 11/2006 | Lasri et al. ..................... 372/18 |
| 2006/0290940 A1 * | 12/2006 | Beaudet et al. ............. 356/470 |
| 2007/0001773 A1 * | 1/2007 | Oxborrow .................... 331/154 |
| 2008/0001062 A1 * | 1/2008 | Gunn et al. ................. 250/206 |
| 2008/0304052 A1 * | 12/2008 | Mitchell et al. ............. 356/149 |
| 2010/0014091 A1 * | 1/2010 | Strabley ..................... 356/469 |

\* cited by examiner

RING-LASER GYROSCOPE SYSTEM USING DISPERSIVE ELEMENT(S)

CROSS-REFERENCES TO RELATED APPLICATIONS

This application claims the benefit of U.S. Provisional Application No. 60/914,947, filed on Apr. 30, 2007.

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to ring-laser gyroscopes. More specifically, the invention is a ring-laser gyroscope system that incorporates one or more dispersive elements to improve sensitivity while suppressing the dead-band.

2. Description of the Related Art

Ring-laser gyroscopes are well known devices used in a variety of navigation, alignment, measurement and/or surveying systems. The operating principles of a ring-laser gyroscope will be explained briefly with the aid of FIG. 1 where an embodiment of a ring-laser gyroscope is illustrated and referenced generally by numeral 10. Three (or more) mirrors 12, 14 and 16 are positioned to define an optical path 18 that reflects off mirrors 12, 14 and 16 to thereby create a continuous and ring-shaped path. A laser light source 20 pumps counter-propagating, continuous-wave laser beams at a selected lasing frequency along path 18 as indicated by arrows 22 and 24. Then, when ring-laser gyroscope 10 is rotated about a central axis 26 as indicated by rotation direction arrow 28, a beat frequency is defined between counter-propagating laser beams 22 and 24. That is, laser beam 24 propagating in the same direction as rotation direction 28 undergoes a first frequency shift while laser beam 22 propagating in the direction opposite to that of rotation direction 28 undergoes a second frequency shift. The difference between the two frequency shifts is known as the beat frequency and is proportional to the rate of rotation. The beat frequency is detected by a beat-note detector 30.

Unfortunately, conventional ring-laser gyroscopes suffer from a dead-band in their response as a result of backscattering as the ring-laser gyroscope rotates. More specifically, at mirrors 12, 14 and 16, minute amounts of backscattered light (at backscattered frequencies) is generated as light from laser beams 22 and 24 interact. This effectively couples beams 22 and 24 together. Light at the backscattered frequencies reduces the gyroscope's sensitivity to low rates of rotation. The dead-band can be avoided by biasing the gyroscope via incorporation of a dithering mirror or by using the Faraday effect. However, a dithering mirror is a moving and noisy optical component while introduction of the Faraday effect causes the gyroscope to be sensitive to magnetic field and temperature variations. The dead-band can be completely eliminated by using short laser pulses. However, while a short-pulse-laser ring-laser gyroscope performs well, shot noise associated with the laser pulses introduces the need to incorporate complex active stabilization. In addition, short pulse lasers require a large pump laser that is typically large and heavy.

SUMMARY OF THE INVENTION

Accordingly, it is an object of the present invention to provide a method and system for improving the rotation rate sensitivity of a ring-laser gyroscope at lower rates of rotation.

Other objects and advantages of the present invention will become more obvious hereinafter in the specification and drawings.

In accordance with the present invention, a ring-laser gyroscope system includes a ring-laser gyroscope (RLG) and at least one dispersive element. The RLG has a ring-shaped optical path. The dispersive element(s) is optically coupled to the RLG's ring-shaped optical path. Each dispersive element has a resonant frequency that is approximately equal to the RLG's lasing frequency. A group index of refraction defined collectively by the dispersive element(s) has (i) a real portion that is greater than zero and less than one, and (ii) an imaginary portion that is less than zero.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 4:
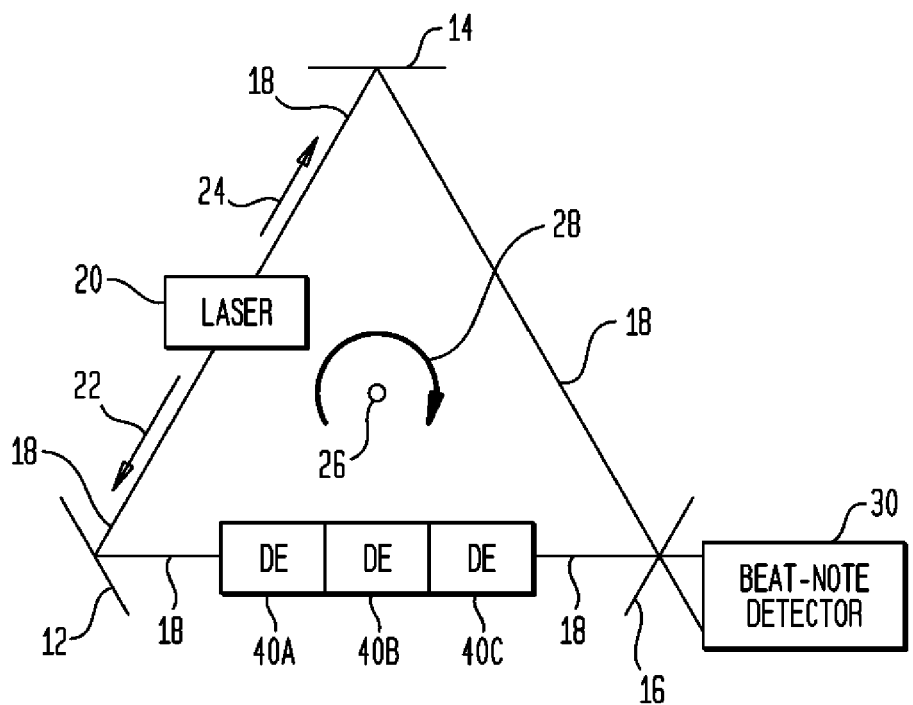
Figure 5:
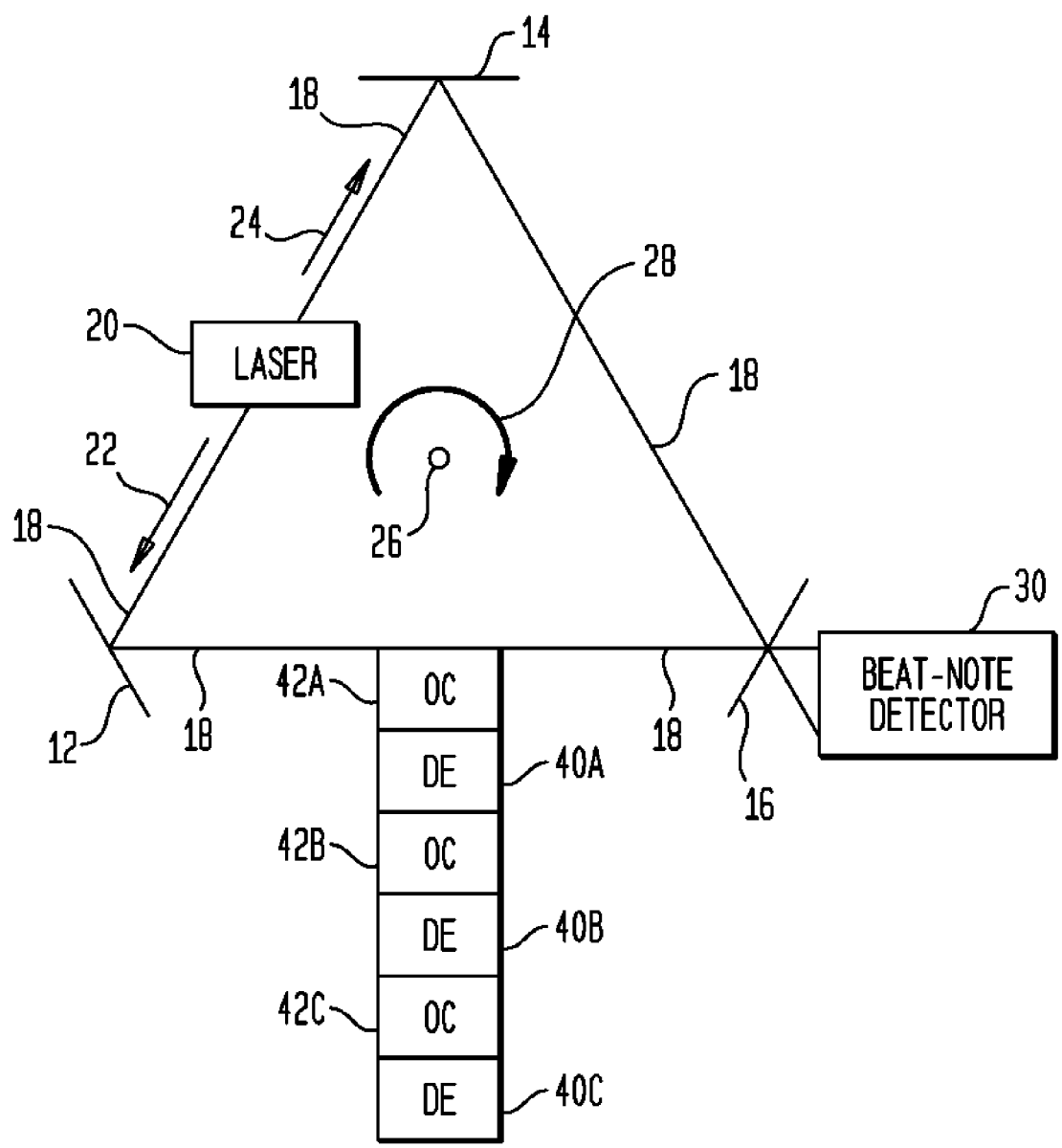

FIG. 4 is a schematic view of a ring-laser gyroscope system incorporating multiple, abutting dispersive elements in accordance with another embodiment of the present invention; and FIG. 5 is a schematic view of a ring-laser gyroscope system incorporating multiple dispersive elements with only one of the dispersive elements receiving light directly from the ring-laser's optical path in accordance with another embodiment of the present invention.

DESCRIPTION OF THE PREFERRED EMBODIMENT(S)

Figure 1:
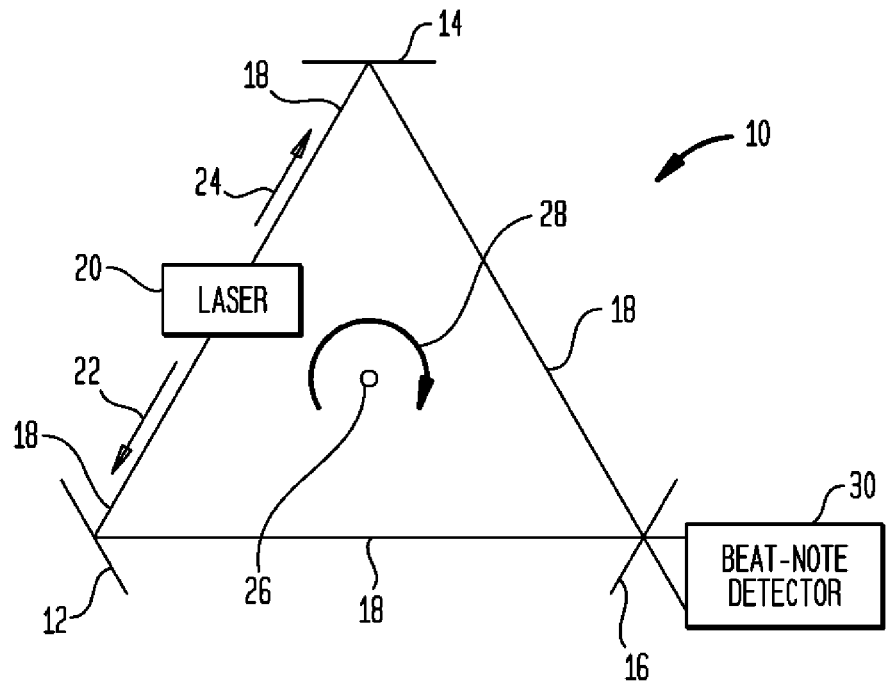
FIG. 1 is a schematic view of a conventional ring-laser gyroscope.
Figure 2:
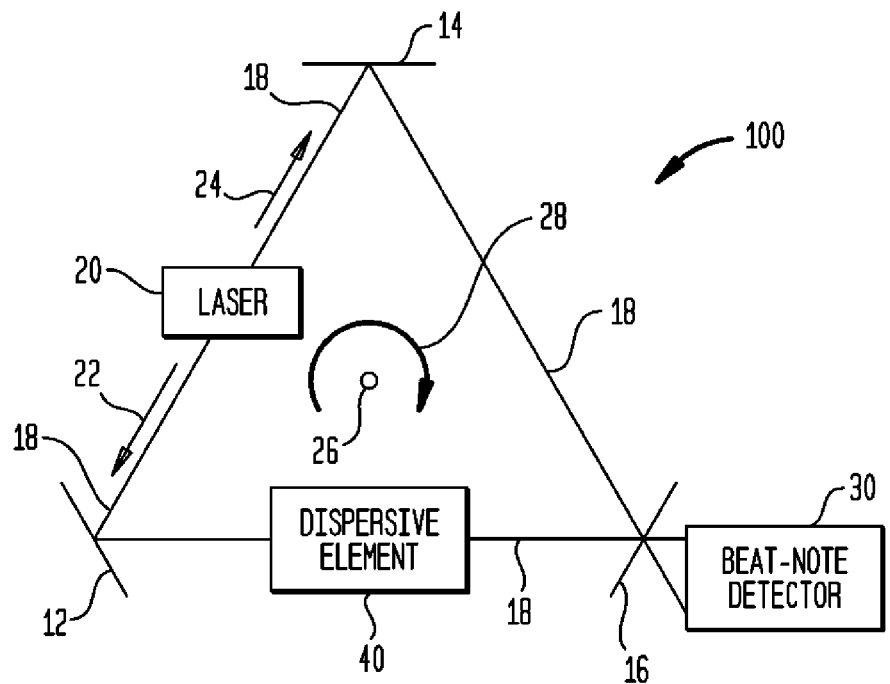
FIG. 2 is a schematic view of a ring-laser gyroscope system incorporating a dispersive element in accordance with an embodiment of the present invention.

Referring again to the drawings and more particularly to FIG. 2, a ring-laser gyroscope system in accordance with an embodiment of the present invention is shown and is referenced generally by numeral 100. Elements of system 100 that are the same as those used in ring-laser gyroscope 10 (FIG. 1) use the same reference numerals and will not be discussed further herein.

In general, the ring-laser gyroscope of the present invention includes at least one dispersive element that is optically coupled to the ring-laser gyroscope's optical path. For example, system 100 incorporates a dispersive element 40 along and in optical path 18 such that the light traversing optical path 18 passes through dispersive element 40. Dispersive element 40 performs two simultaneous functions. First, for a given rotation rate, dispersive element 40 increases the frequency difference (i.e., beat frequency) between the counter-propagating laser beams 22 and 24 as gyroscope system 100 rotates (e.g., as indicated by rotation direction arrow 28) thereby increasing the system's sensitivity at low rotation rates. Second, dispersive element 40 absorbs light at the backscattered frequencies generated as the system rotates. By absorbing light at the backscattered frequencies, system 100 suppresses the dead-band.

Dispersive element 40 is a passive optical "element" capable of achieving the above-described functions. These functions are achieved when the resonant frequency of dispersive element 40 is equal to or approximately equal to the lasing frequency of laser beams 22 and 24, and when the index of refraction of dispersive element 40 has (i) a real portion that is greater than zero but less than one to assure anomalous dispersion, and (ii) an imaginary portion that is less than zero to assure greater absorption at the backscattered frequencies. By positioning this type of dispersive element 40 in optical path 18, dispersive element essentially acts as an amplitude and phase nonlinear filter.

The realization of dispersive element 40 will vary depending on the basic structure of the ring-laser gyroscope. For example, if the ring-laser gyroscope's optical path 18 exists in free space, dispersive element 40 could be realized by a crystal material that can have a narrow anti-hole burned in the crystal's homogenous line resulting in anomalous dispersion at the laser frequency. One such crystal material is the man-made crystal alexandrite. Dispersive element 40 can also be realized by a "region" filled with an atomic gas such that optical path 18 is directed therethrough as system 100 rotates. For smaller and less expensive versions of system 100, optical path 18 could be defined by one or more optical waveguides (e.g., optical fiber, light pipe, etc.). In this case, dispersive element 40 could be made from an arrangement of high-Q whispering-gallery-mode micro-resonators evanescently-coupled to optical path 18 and/or one another where such evanescent coupling is known in the art.

Figure 3:
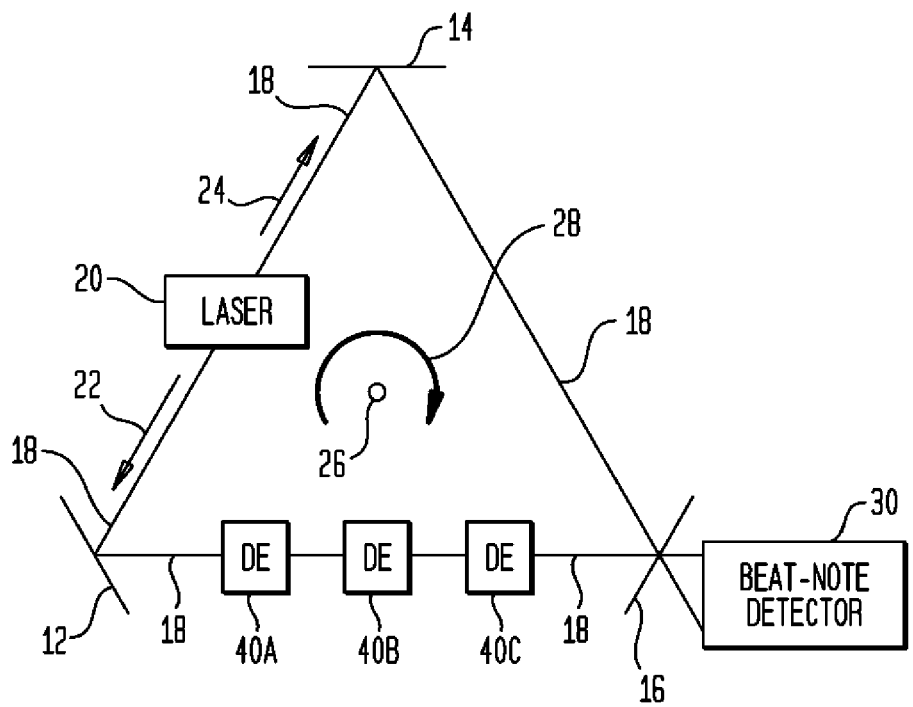
FIG. 3 is a schematic view of a ring-laser gyroscope system incorporating multiple, spaced-apart dispersive elements in accordance with another embodiment of the present invention.

The location of dispersive element 40 is not limited to the position shown as it could be located in any leg of optical path 18. Furthermore, the present invention is not limited to the use of a single dispersive element. For example, FIG. 3 illustrates another ring-laser gyroscope system that has a plurality of dispersive elements ("DE") 40A-40C disposed along optical path 18 in a spaced-apart fashion. Another option is to serially abut a plurality of dispersive elements ("DE") 40A-40C along optical path 18 as shown in FIG. 4. Still another option is to arrange a plurality of dispersive elements ("DE") 40A-40C as shown in FIG. 5 where only one dispersive element 40A is optically coupled ("OC") at 42A directly to optical path 18. The remaining dispersive elements 40B and 40C are arranged in succession and are optically coupled at 42B and 42C, respectively, to receive light indirectly from optical path 18.

It is to be understood that while three dispersive elements are illustrated in each of these embodiments, more or fewer dispersive elements could be used without departing from the scope of the present invention. When more than one dispersive element is used in the present invention, the collective index of refraction defined by the group of dispersive elements must have (i) a real portion that is greater than zero but less than one, and (ii) an imaginary portion that is less than zero.

The advantages of the present invention are numerous. The passive optical dispersive elements(s) improve rotation rate sensitivity while eliminating dead-band in a ring-laser gyroscope. No moving parts or electromagnetic fields are required. The dispersive elements will not increase the size of a ring-laser gyroscope and are relatively inexpensive.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A ring-laser gyroscope system, comprising:
    a ring-laser gyroscope (RLG) having a ring-shaped optical path, said RLG having a lasing frequency; and
    at least one dispersive element optically coupled to said ring-shaped optical path, each said dispersive element having a resonant frequency that is approximately equal to said lasing frequency of said RLG, wherein a group index of refraction defined collectively by said at least one dispersive element has (i) a real portion that is greater than zero and less than one, and (ii) an imaginary portion that is less than zero.

2. A system as in claim 1 wherein said at least one dispersive element comprises a plurality of dispersive elements spaced apart from one another along said ring-shaped optical path.

3. A system as in claim 1 wherein said at least one dispersive element comprises a plurality of dispersive elements abutting one another along said ring-shaped optical path.

4. A system as in claim 1 wherein said at least one dispersive element comprises a plurality of dispersive elements with only one of said dispersive elements coupled directly to said ring-shaped optical path.

5. A system as in claim 1 wherein said ring-shaped optical path is in free space.

6. A system as in claim 1 wherein said ring-shaped optical path is defined by at least one optical waveguide.

7. A system as in claim 1 wherein each said dispersive element comprises a crystal material.

8. A system as in claim 1 wherein each said dispersive element comprises at least one high-Q whispering-gallery-mode micro-resonator.

9. A system as in claim 1 wherein each said dispersive element comprises a region filled with an atomic gas.

10. A ring-laser gyroscope system, comprising:
    a ring-laser gyroscope (RLG) having a ring-shaped optical path, said RLG generating counter-propagating laser beams at a lasing frequency along said ring-shaped optical path wherein a beat frequency is defined between said counter-propagating laser beams when said RLG is rotated, and wherein light at backscattering frequencies is generated as said counter-propagating laser beams traverse said ring-shaped optical path; and
    optical means optically coupled to said ring-shaped optical path for increasing said beat frequency for a given rate of rotation of said RLG and for absorbing said light at backscattering frequencies.

11. A system as in claim 10 wherein said optical means comprises a plurality of passive optical elements spaced apart from one another along said ring-shaped optical path.

12. A system as in claim 10 wherein said optical means comprises a plurality of passive optical elements abutting one another along said ring-shaped optical path.

13. A system as in claim 10 wherein said optical means comprises a plurality of passive optical elements with only one of said passive optical elements coupled directly to said ring-shaped optical path.

14. A system as in claim 10 wherein said ring-shaped optical path is in free space.

15. A system as in claim 10 wherein said ring-shaped optical path is defined by at least one optical waveguide.

16. A system as in claim 10 wherein said optical means comprises a crystal material.

17. A system as in claim 10 wherein said optical means comprises at least one high-Q whispering-gallery-mode micro-resonator.

18. A system as in claim 10 wherein said optical means comprises at least one region filled with an atomic gas.

19. A method of improving rotation-rate sensitivity of a ring-laser gyroscope (RLG) having a lasing frequency, comprising the step of optically coupling at least one dispersive element to said ring-shaped optical path, each said dispersive element having a resonant frequency that is approximately equal to the lasing frequency of the RLG, wherein a group index of refraction defined collectively by said at least one dispersive element has (i) a real portion that is greater than zero and less than one, and (ii) an imaginary portion that is less than zero.

20. A method according to claim 19 wherein said step of optically coupling includes the step of arranging a plurality of dispersive elements in the ring-shaped optical path in a spaced-apart fashion.

21. A method according to claim 19 wherein said step of optically coupling includes the step of arranging a plurality of dispersive elements in the ring-shaped optical path in a serial abutting fashion.

22. A method according to claim 19 wherein said step of optically coupling includes the step of arranging a plurality of dispersive elements with only one of said dispersive elements coupled directly to said ring-shaped optical path.

23. A method according to claim 19 wherein the RLG is a free-space RLG, and wherein each said dispersive element is selected from the group consisting of a crystal material and a region filled with an atomic gas.

24. A method according to claim 19 wherein the RLG is an optical-waveguide RLG, and wherein each said dispersive element comprises at least one high-Q whispering-gallery-mode micro-resonator.

* * * * *